US008452757B2

(12) United States Patent
Murthy

(10) Patent No.: US 8,452,757 B2
(45) Date of Patent: May 28, 2013

(54) INDEX MECHANISM FOR FINDING NEAREST MATCHES IN A COMPUTER SYSTEM

(75) Inventor: Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1435 days.

(21) Appl. No.: 11/388,300

(22) Filed: Mar. 24, 2006

(65) Prior Publication Data

US 2007/0226245 A1  Sep. 27, 2007

(51) Int. Cl.
*G06F 7/00* (2006.01)
(52) U.S. Cl.
USPC .......................................... 707/721; 707/769
(58) Field of Classification Search
USPC ..................... 707/1–10, 100–104.1, 721, 769
See application file for complete search history.

(56) References Cited

U.S. PATENT DOCUMENTS

| 2004/0030691 | A1* | 2/2004 | Woo ................................. | 707/3 |
| 2005/0010564 | A1* | 1/2005 | Metzger et al. .................... | 707/3 |
| 2006/0218123 | A1* | 9/2006 | Chowdhuri et al. .............. | 707/2 |
| 2008/0033960 | A1* | 2/2008 | Banks et al. ....................... | 707/9 |

OTHER PUBLICATIONS

"Oracle Tips by Burleson Consulting" retrieved on Jun. 29, 2006 from the Internet< URL: http://www.dba-oracle.com/t_ault_49_leaf_nodes_branches.htm > (p. 1).
"Turbocharge SQL with advanced Oracle9i indexing" retrieved on Jun. 29, 2006 from the Internet < URL: http://www.dba-oracle.com/art_9i_indexing.htm > (pp. 1 and 2).
"B-tree" retrieved on Jun. 29, 2006 from the Internet < URL: http://www.en.wikipedia.org/wiki/B_tree_indexing > (pp. 1, 2 and 3).

* cited by examiner

*Primary Examiner* — Hosain Alam
*Assistant Examiner* — Navneet K Ahluwalia
(74) *Attorney, Agent, or Firm* — Hickman Palermo Truong Becker Bingham Wong LLP; Daniel D. Ledesma

(57) ABSTRACT

A technique for finding the nearest match in a computer storage system is provided. A query statement includes a new operator that indicates that a user desires to access a set of rows that contain a value nearest to a target value. An index is accessed that is based at least in part on a column reference included in the statement. The index comprises a plurality of leaf nodes, where each leaf node comprises one or more entries, where each entry contains a key value, corresponding to the column reference, and a reference to a row in a table. Because leaf nodes in an index are ordered and linked to one another, a portion of the index need only be scanned once. The set of rows from the table are returned that are referenced by one or more entries whose column values are nearest to the target value.

20 Claims, 5 Drawing Sheets

| | ROWID | A | B | C |
|---|---|---|---|---|
| 110 | 221 | 3 | 5 | 2 |
| 112 | 235 | 6 | 3 | 3 |
| 114 | 245 | 3 | 5 | 4 |
| 116 | 156 | 2 | 3 | 7 |
| 118 | 118 | 1 | 1 | 1 |
| 120 | 246 | 4 | 8 | 2 |
| 122 | 124 | 7 | 4 | 7 |
| 124 | 364 | 2 | 5 | 9 |
| 126 | 123 | 8 | 7 | 6 |
| 128 | 275 | 4 | 6 | 1 |

Table 100; columns 102, 104, 106, 108

*FIG. 1*

INDEX MECHANISM FOR FINDING NEAREST MATCHES IN A COMPUTER SYSTEM

FIELD OF THE INVENTION

The present invention relates to query execution, and more particularly, to executing a query for determining a nearest match.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Relational databases store information in tables that are organized into rows and columns. In non-relational terminology, a row is a record and a column is a field. A user retrieves information from the tables by entering a request that is converted to queries by a database application, which then submits the queries to a database server. In response to the queries, the database server accesses the tables specified by the query to determine which information within the tables satisfies the queries. The information that satisfies the queries is then retrieved by the database server and transmitted to the database application and ultimately to the user.

FIG. 1 illustrates a logical layout of an exemplary table 100 within a relational database. Table 100 comprises three user columns, column A 104, column B 106, and column C 108, and eleven rows 110-128. Table 100 also contains an internal column or pseudocolumn 102, referred to as a rowid. A table's rowid is retrievable by query and uniquely identifies a row in the table, but is not normally displayed when the structure of the table is listed. For example, a rowid of 221 uniquely identifies row 110, which contains the values of 3 in column A 104, 5 in column B 106, and 2 in column C 108. In this example, the values of the columns A 104, B 106, and C 108 are integers, but it is to be understood that columns of a database table can hold values of any of a variety of types including floating point numbers and variable length strings of characters, dates, etc.

For any given database application, the queries to retrieve information from a table must conform to the rules of a particular query language. Most query languages provide users with a variety of ways to specify the information to be retrieved. For example, in the Structured Query Language (SQL), the query, select A from T where A<5, requests the retrieval of the information contained in column A of specified rows of table T that satisfies a specified condition. The conditions in the where clause specify one or more predicates, in this example A<5, which must be satisfied by matching rows. In the example, rows 110, 114, 116, 118, 120, 124, and 128 of table 100 satisfy this query because the corresponding values of column A 104 are 3, 3, 2, 1, 4, 2, and 4, respectively. On the other hand, rows 112, 122, and 126 of table 100 do not satisfy this query because the corresponding values of column A 104 are 6, 7, and 8, respectively.

In order to process the exemplary query, a full table scan may be implemented that reads all the rows from table 100. Thus, the full table scan reads the data for all the columns in table 100, even though only the information from column A 104 was necessary to process the query. If the amount of the rows in a table and/or the data for the columns not used in the query is very large, then the full table scan methodology becomes very inefficient because of the unnecessary amount of disk input/output.

Accordingly, many database systems provide indexes to increase the speed of the data retrieval process. An index is a body of entries ordered by key values of a key. An index key may be, for example, a column of a table. Such a key is referred to herein as a key column. Each index entry identifies a record (e.g. row).

One implementation of a database index is a B-tree, whose logical layout is illustrated in FIG. 2. A B-tree index is a hierarchical arrangement of two types of nodes: leaf nodes and branch nodes. Leaf nodes reside at the lowest level of the B-tree hierarchy and contain values from the actual column or columns upon which the index is built and the rowid of the corresponding rows. Leaf nodes may comprise multiple entries that contain data for many rows, e.g. 100 entries corresponding to 100 rows, but, for purposes of example, leaf nodes are illustrated as containing a single entry. For example, B-tree index 200, being built upon column A 104 of table 100, has leaf nodes 210-228 collectively holding the values of column A 104. Specifically, leaf node 210 holds the index value 1 from column A 104 and the rowid 118, which identifies row 118 of table 100. As another example, leaf node 228 contains an index value of 8 from column A 104 and a rowid of 123, identifying row 126 of table 100. Each leaf node contains a pointer or other link to a previous and subsequent leaf node if such a leaf node exists. For example, leaf node 226, which contains an index value of 7, points to leaf node 228, which contains an index value of 8, and to leaf node 224, which contains an index value of 6.

The non-leaf nodes of a B-tree index are branch nodes. Branch nodes contain information that indicate a range of values. In the illustrated B-tree index 200, nodes 202, 204, 206, and 208 are branch nodes and therefore each corresponds to a range of values. The range of values indicated by each branch node is such that all nodes that reside below a given branch node correspond to the values that fall within the range of values for the given branch node. For example, node 206 is a branch node that corresponds to the numerical range from 4 to 6. Consequently, nodes 220, 222, and 224, which all reside below node 206 in the hierarchy, correspond to values that fall within the range from 4 to 6.

A database server can perform an "index range scan" on B-tree index 200 to process the exemplary query select A from T where A<5, because B-tree index 200 is built on a column referenced in a predicate (A<5) of the where clause of the exemplary query. In an index range scan, the first leaf node within the range of values indicated by the predicate of the where clause is located, and the subsequent leaf nodes are visited until the range of values is exhausted. In this example, because the predicate is A<5, the lowest valued node in the B-tree index 200 is identified by traversing from branch node 202 to branch node 204 to leaf node 210. Beginning with the first leaf node, as long as each leaf node contains an index value that satisfies the predicate, the corresponding row is identified and the subsequent leaf node is inspected. In the example, since leaf node 210 matches the predicate, its link to the next leaf node 212 is followed. In this manner, leaf nodes 212, 214, 216, 218, 220, 222 are successively visited until leaf node 224 is reached, terminating the scan because leaf node 224 contains data for a row with an index value of 6 that does not match the predicate. Since the B-tree index 200 does not store data for the columns upon which the index is not built, and since a selected subset of the index entries are read, the index range scan, in appropriate queries, can serve to reduce the amount of data read from the disk and, hence, improve the efficiency of reading values.

However, there are many instances where a user does not know, a priori, the distribution of data of a particular column in a particular table. Because, the distribution of data determines the range, the user, therefore, does not know what range to include in a query of the database. The user may have an idea of a particular value to search for, but most likely the user will not know if the applicable table contains that particular value.

For example, a user may want to determine which employees have a salary nearest to a target value of $50,000, but the user is unaware of the data distribution (i.e. unaware of whether, or how many, employees have salaries relatively near $50,000). In that case, a range scan is not efficient because the user may only desire the single nearest match (i.e. one row from an employee information table). More importantly, a range scan may not return the closest match since the closest match may be outside of the range provided by the user. For instance, if the user submitted a query indicating rows in the employee information table that have salary values greater than $45,000, the nearest match to $50,000 may be outside that range, such as $44,900.

One way to return the nearest match to the target value of $50,000 is to submit two queries:

```
select EmpID, Salary into :ID1, :Sal1
from Emp
where Salary >= 50000 and rownum < 2;
select EmpID, Salary into :ID2, :Sal2
from Emp
where Salary < 50000 and rownum < 2;
```

Each query limits the number of returned rows to one ("rownum<2"). A comparison must then be performed between the absolute differences of the salaries of the returned rows in order to determine which salary is closest to the target value. An example of such a comparison is the following:

```
if abs(:Sal1 − 50000) <= abs(:Sal2 − 50000) then
    return :ID1
else
    return :ID2
```

The above approach suffers from two significant problems—usability and performance. First, the three-step process is cumbersome. Second, because two queries are being executed, the index is accessed twice. Thus, there is a need to provide a more efficient mechanism for retrieving a row in a table with a value nearest a target value.

DESCRIPTION OF THE DRAWINGS

The present invention is illustrated by way of example, and not by way of limitation, in the figures of the accompanying drawings and in which like reference numerals refer to similar elements and in which:

FIG. 1 illustrates the logical layout of an exemplary table;

DETAILED DESCRIPTION

Figure 2:
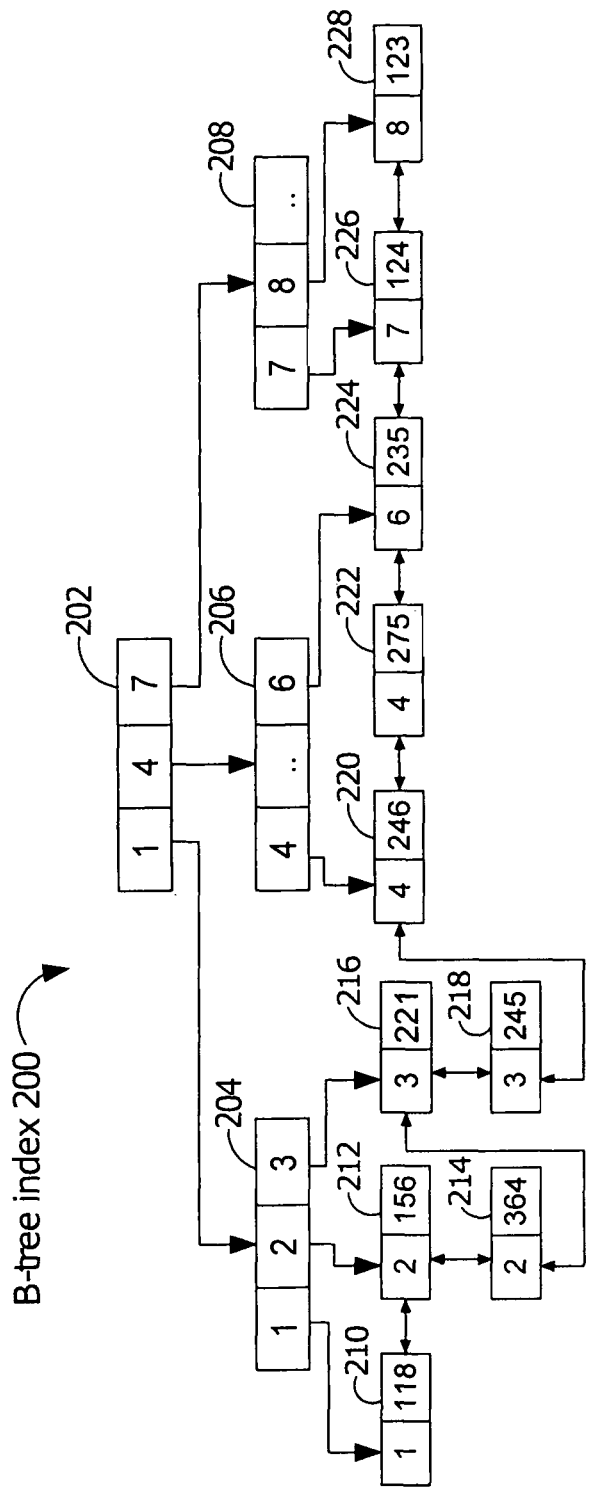
FIG. 2 illustrates the logical layout of an exemplary index built upon a column of the exemplary table shown in FIG. 1.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

A new operator is defined that instructs a query engine (e.g. query engine of a database server) to find one or more rows in a table whose values in a search column are nearest to a target value, wherein the search column and target value are parameters to the new operator. An operator is a command that conforms to a computer language, such as SQL or proprietary forms thereof, and that identifies a particular function that is performed by a query engine when a query that includes the operator is submitted to the query engine. The new operator defined herein has at least the two operands (or parameters) mentioned above. An index, whose key is based at least in part on the search column, only has to be traversed once in order to reach the leaf nodes of the index. The entries of a leaf node, and entries in other leaf nodes referenced by the leaf node, if necessary, are accessed to determine one or more rows whose key values corresponding to the search column are nearest to the target value. The query statement may also specify a number of rows (m) to return wherein each of the rows are the m nearest rows, e.g. in terms of absolute difference, to the target value.

"NEAREST TO" Operator

According to one embodiment, the new operator (hereinafter referred to as the "NEAREST TO" operator) has at least two parameters: one parameter for a column reference and one parameter for a target value. The column reference specifies a search column from which a value nearest to the target value is retrieved. The target value may be of any data type including a number (e.g. integer, float), a date (e.g. dd/mm/yyyy, yyyy/mm), and a string (e.g. ASCII or Unicode).

For example, a query to find the employee identifier of the employee with a salary nearest $50,000 may be the following:

select EmpID, Salary
from Emp
where Salary NEAREST TO 50000;

where EmpID and Salary are columns in an employee table entitled Emp, Salary is the search column in the NEAREST TO operator, and 50000 is the target value.

According to an embodiment, the search column is a key or a leading prefix of a composite key of an index. A composite key is an index key that consists of two or more columns. A given table may have multiple keys and may be associated with multiple indexes. An index upon which a composite key is built is ordered first by the first column (i.e. the leading prefix of key) and then by the second column, and so forth until the last column of the composite key. If the search column is not an index key, nor the leading prefix of a composite key, then a full table scan is required. For example, if Salary is neither the primary key nor the leading prefix of a composite key of any index on the Emp table referenced above, then the NEAREST TO operator would have to perform a full table scan of the Emp table comparing each Salary column of each row to the target value.

Traversal of an Index

Figure 3:
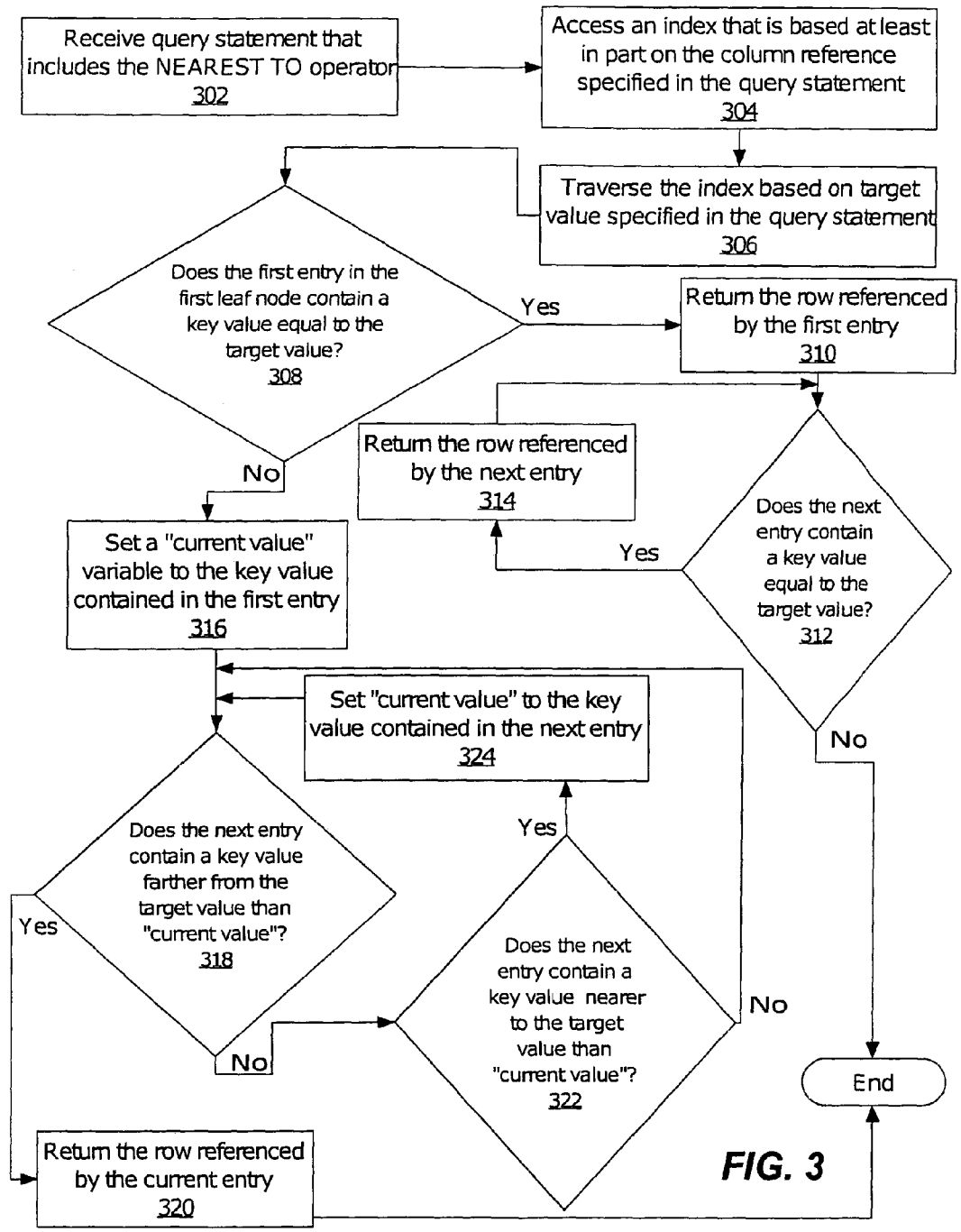
FIG. 3 is a flow diagram that illustrates how an index may be traversed to find a nearest match, according to an embodiment of the invention.

FIG. 3 shows a flow diagram that illustrates how an index may be traversed to find a nearest match, according to an embodiment of the invention. At step 302, a query statement is received that includes the NEAREST TO operator. An index, e.g. a B-tree index, is accessed that is based, at least in part on the search column specified in the query statement (step 304). Specifically, the search column parameter is the key or leading prefix of the composite key of the index. The index includes a body of entries that contain key values of the key of the index. Typically, the entries in the leaf nodes of a B-tree index is ordered from smallest key value to largest key value, as illustrated in FIG. 2. However, the entries may be ordered from largest key value to smallest key value.

The index is traversed to find one or more entries that are nearest to the target value. From the traversal through the branch nodes to the first leaf node (step 306), it is determined whether the first entry in the first leaf node contains a key value equal to the target value (step 308). If so, the row referenced by the first entry is returned (step 310), e.g. by using the rowid contained in the first entry. The following entries in the first leaf (and, if necessary, entries in leaf nodes linked to by the first leaf node) are examined in order to determine whether an entry contains a key value equal to the target value (step 312). In one embodiment, step 312 is not performed and only the first row referenced by the first entry is returned, indicating that the user only desires to see information pertaining to one employee. In that case, the process ends after step 310.

If the next entry (whether it is an entry in the first leaf node, or an entry in a leaf node linked to by the first leaf node) contains a key value equal to the target value, then the row referenced by the next entry is returned (step 314). This process continues until an entry is examined that contains a key value that is not equal to the target value.

If, at step 308, the first entry in the first leaf node does not contain a key value equal to the target value, then, according to many implementations of a B-tree index, that indicates that the key value of the first entry is less than the target value because many implementations order the key values in branch nodes and leaf node entries from smallest key value to largest key value. In these implementations, the first entry in a leaf node does not contain a key value greater than the target value. This is so because branch nodes of a B-tree index indicate a range of key values. The target value will always fall within a range of key values in an applicable branch node. If the target value falls within a particular range of key values of a branch node, then a "lower" branch node, pointed to by an entry in the particular branch node with the lower key value in the particular range, is accessed. Thus, the target value will never be outside the range (i.e. less than or greater than any key value corresponding to the range).

According to other implementations, the ordering is from largest key value to smallest key value (i.e. descending order). The following description is based on an ascending ordering but embodiments are not limited to an ascending ordering.

A "current value" variable may be used to keep track of which entry contains a key value nearest to the target value. At step 316, the current value variable is set to the key value contained in the first entry. Next, it is determined whether the next entry (whether it is an entry in the first leaf node, or an entry in a leaf node linked to by the first leaf node) contains a key value farther from the target value than the value indicated by the current value variable (step 318). If so, then, because key values in subsequent entries are larger than the key value contained in the next entry and thus will only be "farther away" from the target value, the row referenced by the current entry (e.g. the first entry if this is the first iteration of step 318) is returned (step 320). If not, then it is determined whether the next entry contains a key value nearer to the target value than the "current value" (step 322).

If it is determined that the next entry (of step 318) contains a key value nearer to the target value than "current value," then, at step 324, "current value" is set to the key value contained in the entry after the "next entry" entry of step steps 318 and 322. Thus, "next entry" in subsequent iterations of step 318 refers to the entry after the entry referred to as "next entry" in the immediately previous iteration of step 318.

If, at step 322, it is determined that the next entry (of step 318) contains a key value nearer to the target value than "current value," then the entry after "next entry" of step 318 is examined.

In one embodiment, all rows referenced by entries that fail the condition of step 322 and are not succeeded by step 324 are also returned. The following example illustrates such a case.

As an example of the above process, given table 100, suppose a user wanted to find the row or rows whose column A 104 value is nearest to 5 in table 100 of FIG. 1 (step 302). The statement may be the following:

select A, B, C
    from T
    where A NEAREST TO 5;

Because the column 'A' is the key of B-tree index 200, the B-tree index 200 is accessed (step 304). B-tree index 200 is traversed (step 306) first by examining branch node 202, followed by branch node 206, until leaf node 220 is reached. Because leaf node 220 contains a key value (i.e. 4) not equal to the target value (i.e. 5) (step 308) and because each leaf node in B-tree index 200 contains only one entry, leaf nodes to the right of leaf node 220 (indicating equal or higher key values) are examined. Leaf nodes to the left of leaf node 220 need not be examined to determine whether they also contain key values equal to the key value of the leaf node 220. This is so because, as described above, the target value must fall within the range indicated by branch node 206. Thus, leaf nodes that fall outside the range indicated by branch node 206 cannot include entries that contain key values nearest to the target value.

In step 316, the current value variable is set to the key value contained in the first entry (4). Next, it is determined whether the next entry (entry in leaf node 222) contains a key value numerically farther from the target value than the value indicated by the current value variable (step 318). Because 4 is not farther from 5 than 4, it is determined whether the next entry (of step 318) contains a key value numerically nearer to the target value than "current value" (step 320). Because 4 is not numerically nearer to 5 than 4, the entry of leaf node 224 is next examined.

The entry in leaf node 224 contains a 6 as a key value, which is not farther away from 5 than 4 (second iteration of step 318), nor is 6 nearer to 5 than 4 (step 320). The entry of leaf node 226 is next examined.

The entry of leaf node 226 contains a 7 as a key value, which is farther away from 5 than 4 (third iteration of step 318). Therefore, logic proceeds to step 320 where the row referenced by the current entry (i.e. entry corresponding to leaf node 224) is returned. Also, because entries corresponding to leaf nodes 222 and 224 failed the condition of step 322 and were not succeeded by step 324, the rows referenced by those entries may also be returned. Thus, rows 120, 130, and 112 from table 100, corresponding to rowids 246, 275, and 235 are returned.

Set of Nearest Rows

According to one embodiment, not only is the row or rows from a table with key values nearest to the target value returned, but also a set of multiple rows, all of which contain key values nearer to the target value than all other remaining rows in the table. For example, the NEAREST TO operator may have a third parameter that indicates a number of rows with a key value nearest to the target value. A statement for returning the ten employee identifiers of employees with salaries nearest $50,000 may be the following:

select EmpID, Salary
from Emp
where Salary NEAREST TO 50000 ROWS 10;

Here, ten rows corresponding to ten employees will be returned. As opposed to the previous example, where entries in the leaf nodes were examined from left to right (indicated an ascending order), entries that contain key values less than the key value of the first entry of the first examined leaf node may be examined. Thus, links from the first leaf node to leaf nodes to the logical left may be followed.

Figure 4:
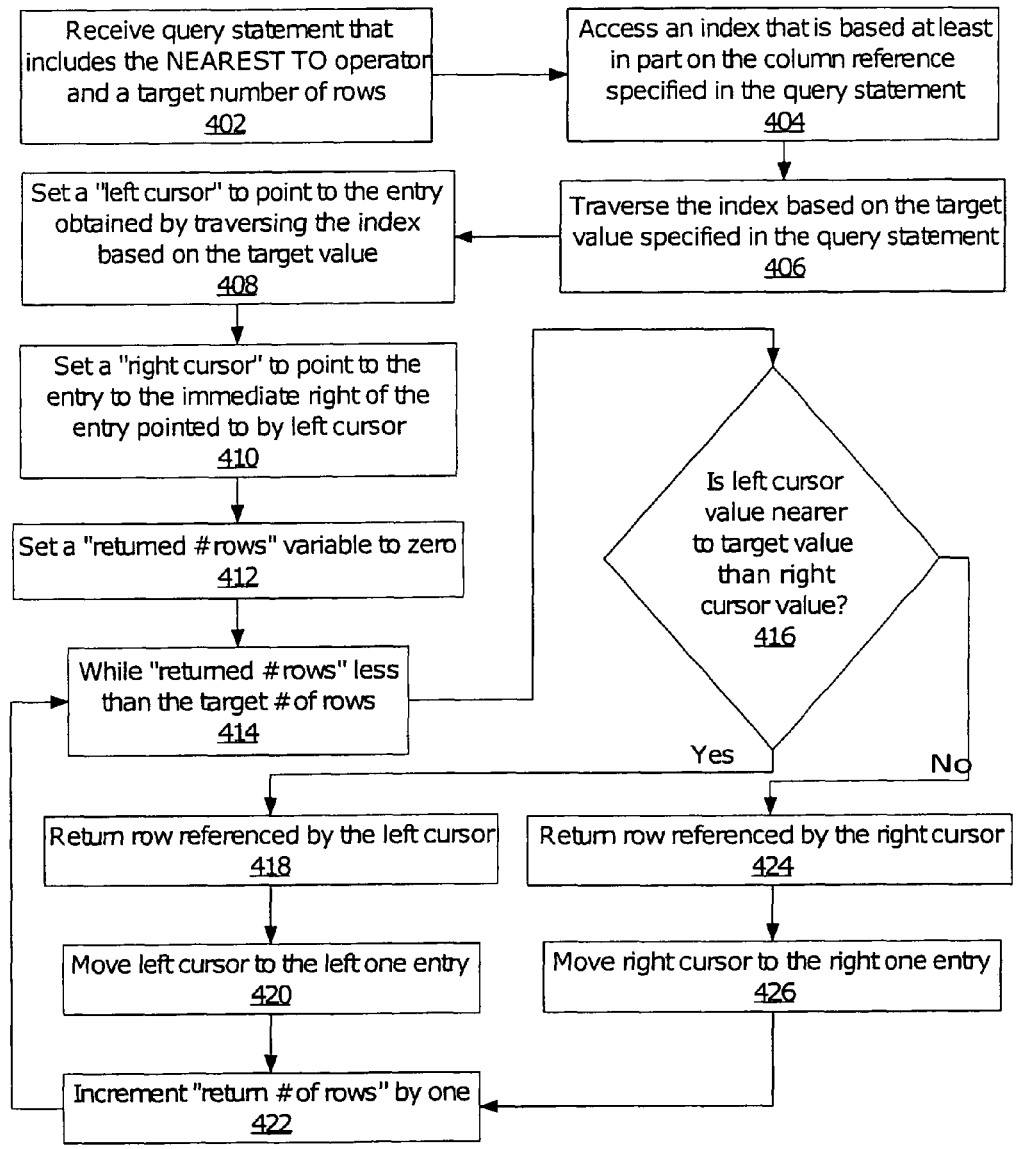
FIG. 4 is a flow diagram that illustrates how an index may be traversed to find a threshold number of rows nearest a target value, according to an embodiment of the invention.

FIG. 4 is a flow diagram that illustrates how an index may be traversed to find a threshold number of rows nearest a target value, according to an embodiment of the invention. Steps 402-406 are similar to steps 302-306 described above, except that the query statement includes a target number of rows. A left cursor is initialized to point to the entry obtained by traversing the index based on the target value (step 408). A right cursor is also initialized to point to the entry to the immediate right of the entry pointed to by the left cursor (step 410). As used herein, a "cursor" is any kind of value useful for traversing leaf nodes in a B-tree, such as B-tree index 200.

At step 412, a "returned # of rows" variable is set to zero. While "returned # of rows" is less than the target number of rows specified in the query statement (step 414), the process continues to step 416. At step 416, it is determined whether the value of the entry pointed to by the left cursor is nearer to the target value than the value of the entry pointed to by the right cursor.

If so, the row referenced by the row pointed to by the left cursor is returned (step 418). The left cursor is moved to point to the entry to the immediate left of the entry currently pointed to by the left cursor (step 420). The "return # of rows" variable is incremented by one (step 422) and the process continues back to step 414.

If the value of the entry pointed to by the left cursor is not nearer to the target value than the value of the entry pointed to by the right cursor (step 416), then the row referenced by the right cursor is returned (step 424) and the right cursor is moved to point to the entry to the immediate right of the entry currently pointed to by the left cursor (step 426).

As an example of the above process, suppose the following statement is received (step 402):

select A, B, C
from T
where A NEAREST TO 4 ROWS 4;

The search column again is A, the target value is 4 and the number of rows to return is 4. B-tree index 200, which has a key of column A, is selected to be examined (step 404). As part of step 406, branch node 202 is examined. It is determined that the target value of 4 is within the range of 4 and 7; thus, branch node 206 is also examined. It is determined that the target value is within the range of 4 and 5; thus leaf node 220 is examined.

In this example, the left cursor will begin pointing at leaf node 220 (step 408) and the right cursor will begin pointing at leaf node 222 (step 410). A "returned # of rows" variable is set to zero (step 412). Because "returned # of rows" is less than four (step 414), the process continues to step 416.

The key value (4) of the entry pointed to by the left cursor is compared to the key value (4) of the entry pointed to by the right cursor. Because 4 is not nearer to the target value than 4 (step 416), the row referenced by the entry of leaf node 222 (i.e. rowid 275) is returned (step 424). The right cursor is moved to point to leaf node 224 (step 426). The "returned # of rows" is incremented by one from zero to equal one (step 422). Because one is less than four (step 414), the process continues to step 416.

The key value (4) of the entry pointed to by the left cursor is compared to the key value (6) of the entry pointed to by the right cursor. Because 4 is nearer to the target value than 6 (step 416), the row referenced by the entry of leaf node 220 (i.e. rowid 246) is returned (step 418). The left cursor is moved to point to leaf node 218 (step 420). The "returned # of rows" is incremented by one to equal two (step 422). Because two is less than four (step 414), the process continues to step 416.

The key value (3) of the entry pointed to by the left cursor is compared to the key value (6) of the entry pointed to by the right cursor. Because 3 is nearer to the target value than 6 (step 416), the row referenced by the entry of leaf node 218 (i.e. rowid 245) is returned (step 418). The left cursor is moved to point to leaf node 216 (step 420). The "returned # of rows" is incremented by one to equal three (step 422). Because three is less than four (step 414), the process continues to step 416.

The key value (3) of the entry pointed to by the left cursor is compared to the key value (6) of the entry pointed to by the right cursor. Because 3 is nearer to the target value than 6 (step 416), the row referenced by the entry of leaf node 216 (i.e. rowid 216) is returned (step 418). The left cursor is moved to point to leaf node 214 (step 420). The "returned # of rows" is incremented by one to equal four (step 422). Because four is not less than four (step 414), the process does not continue to step 416. The process of determining which entries are the four nearest entries in terms of key value to the target value is thus complete.

Distance Function

According to one embodiment, the result set returned from the above statement is ordered by a distance function. One type of distance function is an absolute difference function where the result set is ordered by the absolute difference between the target value and the applicable key value of a particular row in the result set. For example, suppose a query statement against B-tree index 200 is the following:

select A, B, C
from T
where A NEAREST TO 6 ROWS 5;

Because rows identified by leaf nodes 220-228 contain key values that are the five nearest (in terms of absolute difference) to the target value 6, the result set may be the following:

| A | B | C |
|---|---|---|
| 6 | 3 | 3 |
| 7 | 4 | 2 |
| 4 | 8 | 2 |
| 4 | 6 | 1 |
| 8 | 7 | 6 |

According to one embodiment, the NEAREST TO operator has other parameters that may limit the result ret. Another parameter may be one that indicates an absolute difference from the target value in which the applicable key value from each returned row must not exceed. For example, the following statement:

select EmpID, Salary
   from Emp
   where Salary NEAREST TO 50000 ROWS 10 MAXIMUM DISTANCE 1000;

indicates a desire by the user to see the ten employees whose salary is nearest to $50,000, but if any of the ten employees have salaries where the absolute difference with $50,000 is greater than $1,000, then the rows corresponding to those employees are not returned. Thus, a maximum of ten employees, based on the statement, may be returned.

Hardware Overview

Figure 5:
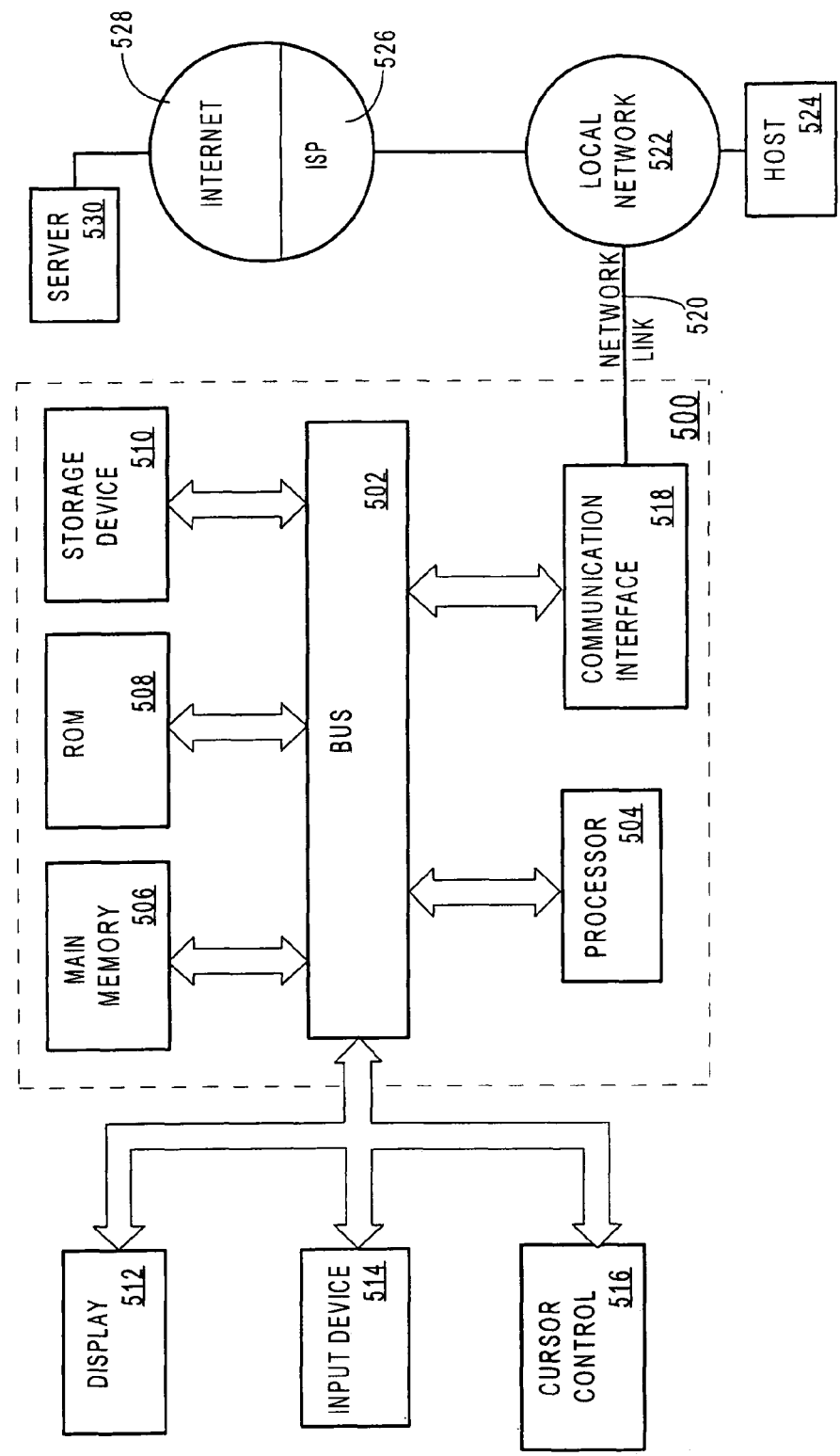
FIG. 5 is a block diagram of a system upon which the techniques described herein may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
computing a statement that contains an operator, wherein operands of the operator include a column reference that indicates a column, target value, and a particular value that specifies a threshold number of entries;
examining an index to compute said statement, said index including a body of entries that contain index values of a key of said index,
wherein said key is based on said column,
wherein examining said index includes traversing said index to identify one or more entries whose index values are closer to said target value than the index value of any other entry in the body of entries;
wherein none of the index values of the one or more entries equals said target value; and
scanning entries contiguous with said one or more entries to determine a plurality of entries that is equal in number to the threshold number of entries;
generating a result based on the one or more entries;
wherein the method is performed by one or more computing devices.

2. The method of claim 1, further comprising:
returning a plurality of rows that correspond to said plurality of entries; and
ordering the plurality of rows based on a distance function.

3. The method of claim 2, wherein the distance function is an absolute difference between the target value and the index value of each entry in said plurality of entries.

4. A method comprising:
receiving a query that includes an operator, a column reference indicating a column of a table, a target value, and a return number, wherein the operator indicates that one or more rows are to be retrieved from the table and that each row of the one or more rows is to contain a value, in said column, nearer to the target value than any other value, in said column, that is associated with a row that is not of the one or more rows;
in response to receiving the query that includes the operator, traversing an index that is based on said table, wherein said column is a key of said index; and
retrieving, based on traversing the index, at least one row in said table that satisfies the query, wherein:
a column of said at least one row corresponds to the column reference;
the value of said column of said at least one row is nearer in value to the target value than the value corresponding to said column of every other row in said table; and
the value of said column of said at least one row is not equal to the target value;
wherein the retrieving said at least one row includes retrieving a plurality of rows equal in number to said return number;
wherein the value in said column of each row in said plurality of rows is nearer in value to the target value than the value in said column of each row in the table that is not in the plurality of rows;
ordering the plurality of rows based on a distance function, wherein the distance function is the absolute difference between the value in said column of each row of said plurality of rows and said target value;
wherein the method is performed by one or more computing devices.

5. A method comprising:
receiving a query that includes an operator, a column reference indicating a column of a table, and a target value that corresponds to said column;
determining to use an index that is based at least partially on the column;
based on the target value, traversing the index to a first leaf node of a plurality of leaf nodes, wherein each leaf node of the plurality of leaf nodes comprises a set of entries, and wherein each entry in said set of entries contains at least a key value and a reference to a row in said table;
if the first leaf node includes an entry that contains a key value that is equal to the target value, then returning a row that is referenced by the entry;
if the first leaf node does not include an entry that contains a key value that is equal to the target value, then:
determining a nearest entry that contains a key value nearest to the target value, wherein the nearest entry is included in a leaf node that is adjacent to the first leaf node; and
returning a row referenced by the nearest entry;
wherein the method is performed by one or more computing devices.

6. The method of claim 5, wherein:
the first leaf node does not include an entry that contains a key value that is equal to the target value;
the query further includes a return number,
the method further comprising returning a plurality of rows that is equal in number to the return number, and
the value of each entry that references a row in the plurality of rows is nearer to the target value than all other values, in the column, that are not in the plurality of rows.

7. The method of claim 6, wherein returning a plurality of rows includes scanning leaf nodes both left and right of the first leaf node in a stepwise fashion to return the plurality of rows.

8. The method of claim 6, further comprising ordering the plurality of rows based on a distance function.

9. The method of claim 8, wherein the distance function is the absolute difference between the value in said column of each row of said plurality of rows and said target value.

10. The method of claim 1, wherein each entry of the one or more entries corresponds to only one row in a table that includes said column.

11. One or more non-transitory machine-readable storage media storing instructions which, when executed by one or more processors, cause:
- computing a statement that contains an operator, wherein operands of the operator include a column reference that indicates a column, a target value, and a particular value that specifies a threshold number of entries;
- examining an index to compute said statement, said index including a body of entries that contain index values of a key of said index,
- wherein said key is based on said column,
- wherein examining said index includes traversing said index to identify one or more entries whose index values are closer to said target value than the index value of any other entry in the body of entries;
- wherein none of the index values of the one or more entries equals said target value; and
- scanning entries contiguous with said one or more entries to determine a plurality of entries that is equal in number to the threshold number of entries;
- generating a result based on the one or more entries.

12. The one or more non-transitory machine-readable storage media of claim 11, wherein the instructions, when executed by the one or more processors, further cause:
- returning a plurality of rows that correspond to said plurality of entries; and
- ordering the plurality of rows based on a distance function.

13. The one or more non-transitory machine-readable storage media of claim 12, wherein the distance function is the absolute difference between the target value and the index value of each entry in said plurality of entries.

14. One or more machine-readable storage media storing instructions which, when executed by one or more processors, cause:
- receiving a query that includes an operator, a column reference indicating a column of a table, a target value, and a return number, wherein the operator indicates that one or more rows are to be retrieved from the table and that each row of the one or more rows is to contain a value, in said column, nearer to the target value than any other value, in said column, that is associated with a row that is not of the one or more rows;
- in response to receiving the query that includes the operator, traversing an index that is based on said table, wherein said column is a key of said index; and
- retrieving, based on traversing the index, at least one row in said table that satisfies the query, wherein:
  - a column of said at least one row corresponds to the column reference;
  - the value of said column of said at least one row is nearer in value to the target value than the value corresponding to said column of every other row in said table; and
  - the value of said column of said at least one row is not equal to the target value;
- wherein the retrieving said at least one row includes retrieving a plurality of rows equal in number to said return number;
- wherein the value in said column of each row in said plurality of rows is nearer in value to the target value than the value in said column of each row in the table that is not in the plurality of rows;
- ordering the plurality of rows based on a distance function, wherein the distance function is the absolute difference between the value in said column of each row of said plurality of rows and said target value.

15. One or more machine-readable storage media storing instructions which, when executed by one or more processors, cause:
- receiving a query that includes an operator, a column reference indicating a column of a table, and a target value that corresponds to said column;
- determining to use an index that is based at least partially on the column;
- based on the target value, traversing the index to a first leaf node of a plurality of leaf nodes, wherein each leaf node of the plurality of leaf nodes comprises a set of entries, and wherein each entry in said set of entries contains at least a key value and a reference to a row in said table;
- if the first leaf node includes an entry that contains a key value that is equal to the target value, then returning a row that is referenced by the entry;
- if the first leaf node does not include an entry that contains a key value that is equal to the target value, then:
  - determining a nearest entry that contains a key value nearest to the target value, wherein the nearest entry is included in a leaf node that is adjacent to the first leaf node; and
  - returning a row referenced by the nearest entry.

16. The one or more non-transitory machine-readable storage media of claim 15, wherein:
- the first leaf node does not include an entry that contains a key value that is equal to the target value;
- the query further includes a return number,
- the instructions, when executed by the one or more processors, further cause returning a plurality of rows that is equal in number to the return number, and
- the value of each entry that references a row in the plurality of rows is nearer to the target value than all other values, in the column, that are not in the plurality of rows.

17. The one or more non-transitory machine-readable storage media of claim 16, wherein returning a plurality of rows includes scanning leaf nodes both left and right of the first leaf node in a stepwise fashion to return the plurality of rows.

18. The one or more non-transitory machine-readable storage media of claim 16, wherein the instructions, when executed by the one or more processors, further cause:
- ordering the plurality of rows based on a distance function.

19. The one or more non-transitory machine-readable storage media of claim 18, wherein the distance function is the absolute difference between the value in said column of each row of said plurality of rows and said target value.

20. The one or more non-transitory machine-readable storage media of claim 11, wherein each entry of the one or more entries corresponds to only one row in a table that includes said column.

* * * * *